United States Patent Office 3,561,814
Patented Feb. 9, 1971

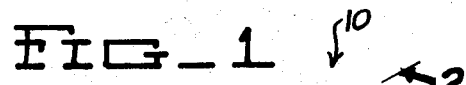
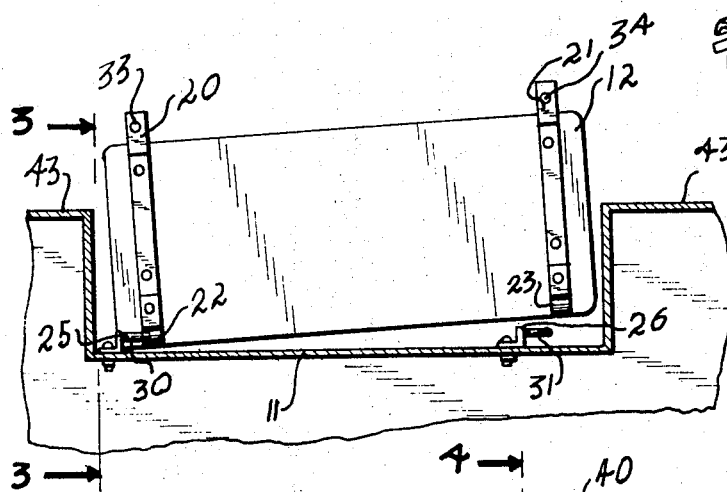
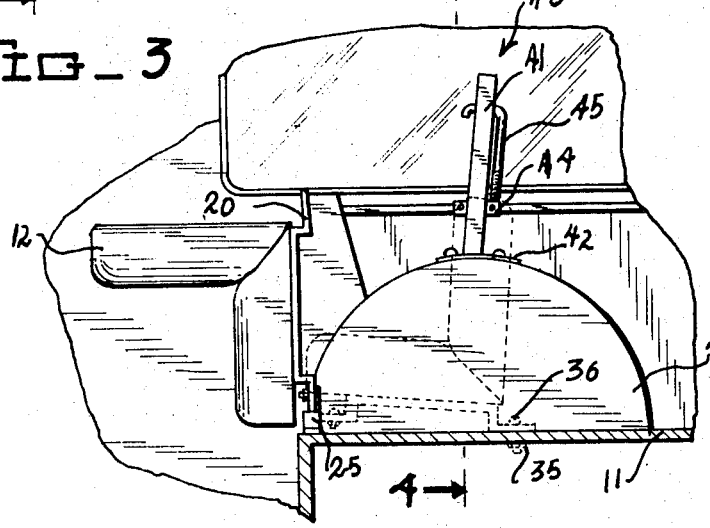
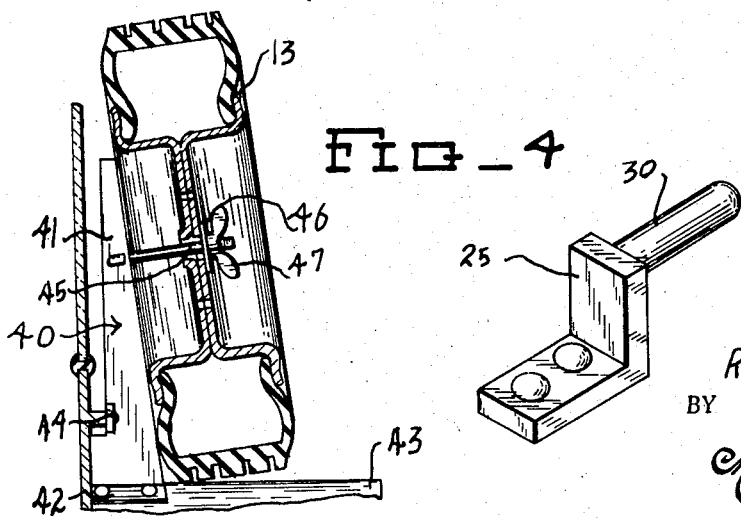

3,561,814
REAR SEAT MODIFICATION KIT AND METHOD
Reuben Klein, West Highway 210—I-94,
Fergus Falls, Minn. 56537
Filed Aug. 8, 1969, Ser. No. 848,650
Int. Cl. B60n 1/10
U.S. Cl. 296—65           3 Claims

ABSTRACT OF THE DISCLOSURE

Two sets of pin and bushing members affixed between the forward edge of the rear seat in a utility vehicle and the floor of the vehicle so that the rear seat is pivotal in a forward direction from the upright position and removable by disengaging the pin and bushing members. The modification further including means for affixing the spare wheel above one of the wheel wells in the rear of the vehicle so that the entire rear portion of the vehicle can be cleared for load-carrying purposes.

BACKGROUND OF THE INVENTION

Field of the invention

In most utility-type vehicles and the like the rear seat is fixedly attached to the floor of the vehicle and, in some of these vehicles, the spare wheel is attached to the floor of the vehicle behind the rear seat. Because of the position of the rear wheel and the fixedly attached rear seat the load-carrying capacity of the vehicles is greatly limited.

SUMMARY OF THE INVENTION

The present invention pertains to apparatus and method for modifying utility-type vehicles to render the rear seat pivotal forwardly from an upright position and removable and for repositioning the spare wheel to render the rear portion of the vehicle clear for receiving a load therein.

It is an object of the present invention to provide a modification kit for use with utility-type vehicles and the like to clear the rear portion thereof for more efficient use.

It is a further object of the present invention to provide a method of modifying utility-type vehicles and the like so that the rear seat is pivotable and removable and so that the spare wheel is repositioned.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a view in perspective of a utility-type vehicle;

FIG. 2 is an enlarged sectional view as seen from the line 2—2 in FIG. 1, with the rear seat pivoted forwardly and partially removed;

FIG. 3 is a sectional view as seen from the line 3—3 in FIG. 2, illustrating in dotted lines the rear seat in the upright position;

FIG. 4 is an enlarged sectional view as seen from the line 4—4 in FIG. 3, illustrating the spare wheel-positioning apparatus with a spare wheel positioned thereon; and FIG. 5 is an enlarged exploded view in perspective of a pin and bushing member for pivotally affixing the rear seat to the floor of the vehicle.

DESCRIPTION OF THE PREFERRED EMBODIMENT

Referring to the figures, the numeral 10 generally designates a utility-type vehicle or the like, which may be any of the great variety of vehicles commercially available that are useable for carrying passengers and/or loads. Typical examples of such utility vehicles are presently being sold under the trade names Jeep, Scout and Bronco. These utility-type vehicles are sold with a floor 11 extending rearwardly from adjacent the front seat and a rear seat 12 fixedly attached to the floor 11 in a rearwardly spaced position from the front seat. A spare wheel 13 is affixed to the floor 11 approximately centrally behind the rear seat 12. Thus, the load-carrying capacity of the vehicle 10 is substantially reduced in its normal embodiment.

In this embodiment the rear seat 12 is disengaged from the floor 11 and bolts or the like utilized to fix the seat 12 to the floor 11 are removed. Elongated metal bars 20 and 21 are affixed to the underside of the seat 12 adjacent the ends thereof so as to extend generally parallel with each other and with the direction of movement of the vehicle 10. Each of the bars 20 and 21 have a generally Z-shaped bend adjacent each end thereof so that the ends are parallel with the central portion but spaced therefrom away from the underside of the seat 12. The forward ends of each of the bars 20 and 21 have bushings 22 and 23, respectively, affixed thereto by some convenient means such as bolts, rivets or the like. The bushings 22 and 23 are generally tubular pieces of metal and may be formed as an integral part of the bars 20 and 21, if desired. Further, the bushings 22 and 23 are mounted so as to be positioned generally beneath the forward edge of the rear seat 12 with the central openings therethrough generally axially aligned.

Two L-shaped brackets 25 and 26 are affixed to the floor 11 in spaced-apart relationship by some convenient means, such as welding, bolts, etc. The L-shaped brackets 25 and 26 are affixed to the floor 11 so that one arm of each extends vertically upwardly. Two pins 30 and 31, having an outer diameter slightly smaller than the inner diameter of the bushings 22 and 23, are affixed to the upwardly extending arms of the brackets 25 and 26 so as to extend generally horizontally outwardly therefrom in an axially aligned relationship. The vertically upwardly extending arms of the brackets 25 and 26 are spaced apart a distance approximately equal to the distance between similar sides of the bushings 22 and 23 and the pins 30 and 31 extend outwardly in the same direction therefrom. The pin 30 has a somewhat greater axial length than the pin 31.

To affix the rear seat 12 to the floor 11 the bushing 22 is aligned with the pin 30 and the pin 30 is inserted a short distance into the bushing 22. The pin 30 then acts as a guide to hold the bushing 22 and the associated side of the rear seat 12 in position while the bushing 23 is axially aligned with the pin 31. Upon alignment of the bushing 23 with the pin 31 the entire rear seat 12 is moved transversely or axially along the pins 30 and 31. With the pins 30 and 31 engaged in the bushings 22 and 23, respectively, the seat 12 is pivotally affixed to the floor 11 so that it can be moved into or from a forwardly pivoted position (illustrated in full lines in FIG. 3) to an upright position (illustrated in dotted lines in FIG. 3). Thus, the seat 12 can be pivoted forwardly from the upright position to substantially clear the floor 11 for receiving a load thereon or the seat 12 can be removed completely if desired.

In the present embodimnt the rear ends of the bars 20 and 21 have openings 33 and 34 provided therethrough for affixing the rear edge of the seat 12 to the floor 11 to prevent forward rotation during slowing or stopping movements of the vehicle 10. Openings are also formed in the floor 11, which are in axial alignment with the openings 33 and 34 when the seat 12 is in the engaged upright position, and nuts 35 are welded to the underside of the floor 11 in alignment with the holes therethrough. Thus, to affix the rear edge of the seat 12 in the upright position bolts 36 are inserted through the openings 33 and 34 and threadedly engaged with the nuts 35. It should be understood that the rear edge of the seat 12 might not be affixed to the floor 11 in some instances or many other types of means for releasably affixing the rear edge might be designed by those skilled in the art. However, the present bolts 36 and nuts 35 are illustrated because of their simplicity and because the floor 11 remains relatively free of obstructions when the seat 12 is removed.

Referring specifically to FIGS. 3 and 4, an upstanding bracket generally designated 40 is illustrated. The bracket 40 includes a generally triangularly shaped piece of metal 41 having outwardly extending flanges 42 at the bottom formed as an integral part thereof. The flanges 42 are shaped to fit the upper curved surface of either wheel, well, designated 43, in the back of the vehicle 10 adjacent the floor 11. For additional support flanges 44 extend outwardly from either side thereof (forwardly and backwardly) part way up the inner side of the metal piece 41 adjacent the vertical wall of the vehicle 10 and metal screws or the like are inserted through holes therein and threadedly engaged into the vertical wall of the vehicle 10. A hook-shaped rod 45 is engaged through an opening extending through the metal piece 41 adjacent the upper end thereof so as to allow for pivotal movements of an outwardly extending portion of the rod 45. The outwardly extending portion of the rod 45 is threaded and adapted to fit through the central opening of the spare wheel 13. An enlarged washer 46 and wing nut 47 are engaged on the threaded end of the rod 45 with the spare wheel 13 correctly positioned so that the spare wheel 13 is securely mounted above one of the wheel wells 43 to leave the floor 11 clear for receiving loads thereon. It should be understood that the upstanding bracket 40 could be formed in a variety of configurations and the present configuration is illustrated because of its simplicity and ruggedness.

Thus, modification means and a method are described for converting a utility vehicle so that passengers and/or a load can be carried more conveniently and efficiently. Further, the modifying apparatus provides for efficient and speedy installation or removal of the rear seat as well as simply allowing the rear seat to be pivoted forwardly to provide more room in the rear of the vehicle.

What is claimed is:
1. Modification means for use with utility-type vehicles and the like, having a fixedly attached rear seat and a spare wheel affixed to the floor in the rear of the rear seat, comprising:
  (a) first separable pin and bushing members having attaching means associated therewith for affixing said first members between the floor of the vehicle and the underside of the rear seat for relative pivotal movements;
  (b) second separable pin and bushing members having attaching means associated therewith for affixing said second members between the floor of the vehicle and the underside of the rear seat for relative pivotal movements and generally in axial alignment with said first pin and bushing members;
  (c) said first pin member being axially longer than said second pin member for providing initial alignment of said bushing members with said pin members after separation thereof; and
  (d) an upstanding bracket having means associated therewith for affixing said bracket to the upper surface of a wheel well and further means associated therewith for receiving thereon the spare wheel.

2. Modification means for use with utility-type vehicles and the like, having a fixedly attached rear seat, comprising:
  (a) first separable pin and bushing members having attaching means associated therewith for affixing said first members between the floor of the vehicle and the underside of the rear seat for relative pivotal movements;
  (b) second separable pin and bushing members having attaching means associated therewith for affixing said second members between the floor of the vehicle and the underside of the rear seat for relative pivotal movements and generally in axial alignment with said first members; and
  (c) said first pin member being axially longer than said second pin member for providing initial alignment of said bushing members with said pin members after separation thereof.

3. Modification means as set forth in claim 2 wherein the bushing members are affixed to the underside of the rear seat so as to engage the pin members adjacent the forward edge thereof and include means for removably affixing the rear edge of the rear seat to the floor.

References Cited

UNITED STATES PATENTS

| 740,897 | 10/1903 | MacAlman | 296—65 |
| 2,626,182 | 1/1953 | Troth et al. | 16—176X |
| 2,822,859 | 2/1958 | Stanfield | 297—326X |

LEO FRIAGLIA, Primary Examiner

L. J. PAPERNER, Assistant Examiner

U.S. Cl. X.R.

29—434